United States Patent [19]

Gibson et al.

[11] 4,070,296
[45] Jan. 24, 1978

[54] TRIBOELECTRICALLY CONTROLLED COVALENTLY DYED TONER MATERIALS

[75] Inventors: Harry W. Gibson, Penfield; Wolfgang H. H. Gunther, Webster, both of N.Y.

[73] Assignee: Xerox Corporation, Stamford, Conn.

[21] Appl. No.: 500,762

[22] Filed: Aug. 26, 1974

[51] Int. Cl.² ............................ G03G 9/08; G03G 9/10
[52] U.S. Cl. .................................. 252/62.1 P; 8/1 A; 8/1 E; 8/4; 8/DIG. 7; 96/1 SD; 96/1.2; 252/62.1 R; 260/37 N; 260/37 P; 260/37 NP; 427/20; 526/49
[58] Field of Search ................ 260/39 P, 42.21, 37 D, 260/37 NP, 37 N; 252/62.1 P, 62.1 R; 8/4, 1 E, 1 A, DIG. 7; 96/1 SD, 1.2; 427/20; 526/49

[56] References Cited

U.S. PATENT DOCUMENTS

| | | | |
|---|---|---|---|
| 3,190,850 | 6/1965 | Burke .............................. | 8/DIG. 7 |
| 3,467,642 | 9/1969 | Horiguchi et al. ................ | 8/DIG. 7 |
| 3,554,946 | 1/1971 | Okuno et al. ..................... | 252/62.1 |
| 3,585,172 | 6/1971 | Nishiyama ......................... | 526/49 |
| 3,634,251 | 1/1972 | Maeda et al. ..................... | 252/62.1 P |
| 3,793,048 | 2/1974 | Nagashinio et al. .............. | 252/62.1 |

FOREIGN PATENT DOCUMENTS

| | | | |
|---|---|---|---|
| 1,181,287 | 2/1970 | United Kingdom ................. | 252/62.1 |

OTHER PUBLICATIONS

"Reaction Mechanisms in Organic Analytical Chemistry", Connors, published by John Wiley & Sons, N.Y. 1973, p. 517.
"Physical Organic Chemistry", Hines, 2nd Ed., McGraw-Hill, N.Y., 1962, pp. 287, 288.
Webster's Dictionary, p. 70.

*Primary Examiner*—Mayer Weinblatt
*Assistant Examiner*—John D. Smith

[57] ABSTRACT

Electrostatographic developer compositions for use in developing electrostatic latent images wherein the triboelectric charging properties of functional polymers employed in the toner materials are controlled by systematic chemical modification. The functionalized polymers are covalently bonded with functional dyes to provide colored toner materials possessing controlled triboelectric properties and stable colorants.

18 Claims, 2 Drawing Figures

FIG. 1

FIG. 2

TRIBOELECTRICALLY CONTROLLED COVALENTLY DYED TONER MATERIALS

This invention relates in general to imaging systems and more particularly to improved electrostatographic developer mixtures for use in such systems.

The formation and development of images on the surface of photoconductive materials by electrostatographic means is known. The basic electrostatographic process as taught by C. F. Carlson in U.S. Pat. No. 2,297,691, involves placing a uniform electrostatic charge on a photoconductive insulating layer to a light and shadow image to dissipate the charge on the areas of the layer exposed to the light, and developing the resultant electrostatic latent image by depositing on the image, a finely-divided electroscopic material referred to in the art as "toner". The toner is attracted to those areas of the layer which retain a charge, thereby forming a toner image corresponding the electrostatic latent image. This "powder" image may then be transferred, usually electrostatically, to a support surface such as paper. The transferred image may subsequently be permanently affixed to the support surface by heat or other suitable affixing means such as solvent or overcoating treatment may be used instead.

Many methods are known for applying the electroscopic particles to the latent image to be developed. One development method as disclosed by E. N. Wise in U.S. Pat. No. 2,618,582 is known as "cascade" development. In this method, developer material, comprising relatively large carrier particles, having finely-divided toner particles electrostatically clinging to the surface of the carrier particles, is conveyed to, and rolled, or cascaded across the surface bearing the electrostatic latent image. The charged portions of the surface have a charge of the same polarity as, but stronger than, the carrier particles. Toner and carrier particles having opposite polarities are selected so that the toner particles cling to the carrier particles. In order to develop a negatively charged electrostatic latent image, a toner and carrier combination are selected in which the toner is triboelectrically positive in relation to the carrier. Conversely, to develop a positively charged electrostatic latent image, a toner and carrier combination, wherein the toner is triboelectrically negative in relation to the carrier is used. The triboelectric relationship between the toner and carrier depends on the relative positions of the materials in the "triboelectric series". In this series, materials are arranged in ascending order of their ability to take on a positive charge. Each material is positive with respect to any material classified below it in the series; and, negative with respect to any material above it in the series. As the developer mixture cascades or rolls across the imagebearing surface, the toner particles are electrostatically attracted from the carrier to the charged portions of the imagebearing surface, whereas they are not electrostatically attracted to the uncharged or background portions of the image which they contact. The carrier particles and unused toner particles are then recycled. The cascade development process is extremely good for the development of line copy images, and is the most widely used commercial electrostatographic development technique. A general purpose office copying machine incorporating this technique is described in U.S. Pat. No. 3,099,943.

Another technique for developing electrostatic latent images is the "magnetic brush" process as disclosed, for example in U.S. Pat. No. 2,874,063. In this process, a developer material containing toner and magnetic carrier particles is attracted to and is carried by a magnet. The magnetic field causes alignment of the magnetic particles in a brush-like configuration. When this magnetic brush is brought into contact with an electrostatic latent image-bearing surface, the toner particles are attracted from the carrier particles of the brush to the charged areas of the image-bearing surface but not to the uncharged areas. Since the charged areas have an image-wise configuration, the toner material clings to the surface in imagewise configuration, thus developing the latent image.

Another method for developing electrostatic latent images is disclosed in U.S. Pat. No. 3,503,776 issued to R. W. Gundlach. In this method, images are formed by transporting an electrostatic latent image-bearing surface in a generally ascending arcuate pass, and contacting only the image in a contact zone with a bath of developer material transported in a concave chamber adjacent the lower path of the imaging surface. The contact zone extends from about the lowermost point of the arcuate path to the uppermost point of the arcuate path. As the imaging surface is transported along its arcuate path, frictional contact between the developer and the imaging surface in the contact zone circulates the developer in the bath and brings developer material into developing configuration with the imaged surface.

Many other methods, such as the "touchdown" development method disclosed by C. R. Mayo in U.S. Pat. No. 2,895,847, are known for applying electroscopic particles to the electrostatic latent image to be developed. The development process, as described above, together with numerous modifications, are well-known to the art through various patents and publications and through the widespread availability and utilization of electrostatographic imaging equipment.

In automatic reproduction equipment, it is conventional to employ as the imaging plate, a photoconductor on a conductive substrate in the form of a cylindrical drum or a flexible belt which is continuously rotated through a cycle of sequential operations including charging, exposing, developing, transferring and cleaning. The developer chamber is charged with a developer mixture comprising carrier particles and enough toner particles for hundreds of reproduction cycles. Generally, the freshly charged developer mixtures contain between about 1.5 and about 5% toner particles based upon the weight of the devloper. This initial concentration provides sufficient toner for many reproduction cycles without causing undesirably high background toner deposition.

While ordinarily capable of producing good quality image, conventional developing systems suffer serious deficiencies in certain areas. In the reproduction of high contrast copies such as letters, tracings and the like, it is desirable to select the electroscopic powder and carrier materials so that their mutual electrification is relatively large; the degree of such electrification being governed in most cases by their relative positions in the triboelectric series. However, when otherwise compatible electroscopic powder and carrier materials are removed from each other in the triboelectric series by too great a distance, the resulting images are very faint because the attractive forces between the carrier and toner particles compete with the attractive forces between the electrostatic latent image and the carrier particles. Although the image density described in the immediately preceding sentence may be improved by increasing the toner concentration in the developer mixture, undesirably high background toner deposition as well as increased toner impaction and agglomeration is encountered when the developer mixture is overtoned. The initial electrostatographic plate charge may be increased to improve the density of the deposited powder image, but the plate charge would ordinarily have to be excessively high in order to attract the electroscopic powder away from the carrier particle. Excessively high electrostatographic plate charges are not only undesirable because of the high power consumption necessary to maintain the electrostatographic plate at high potentials, but also because the high potential causes the carrier particles to adhere to the electrostatographic plate surface rather than merely roll across and off the electrostatographic plate surface. Print deletion and massive carry-over of carrier particles often occur when carrier particles adhere to reusable electrostatographic imaging surfaces. Massive carrier carry-over problems are particularly acute when the developer is employed in solid area coverage machines where excessive quantities of toner particles are removed from carrier particles thereby leaving many carrier particles substantially bare of toner particles. Further, adherence of carrier particles to reusable electrostatographic imaging surfaces promotes the formation of undesirable scatches on the surfaces during the image transfer and surface cleaning operations.

Thus, it is apparent from the description presented above as well as in other development techniques, that the toner is subjected to severe mechanical attrition which tends to break down the particles into undesirable dust fines. The formation of fines is retarded when the toner contains a tough, high molecular weight resin which is capable of withstanding the shear and impact forces imparted to the toner in the machine. Unfortunately, many high molecular weight materials cannot be employed in high speed automatic machines because they cannot be rapidly fused during a powder image heat fixing step. On the other hand, low molecular weight resins which are easily heat fused at relatively low temperatures are usually undesirable because these materials tend to form thick films on reusable photoconductor surfaces. These films tend to cause image degradation and contribute to machine maintenance down time. Many low molecular weight resins decompose when subjected to fusing conditions in high speed copying and duplicating machines. In addition, low molecular weight resins tend to form tacky images on the copy sheet which are easily smudged and often offset to other adjacent sheets. Additionally, low molecular weight resins are often extremely difficult or even impossible to comminute in conventional grinding apparatus. Also, the toner materials must be capable of accepting a charge of the correct polarity when brought into rubbing contact with the surface of carrier materials in cascade or touchdown development systems. Additionally, many toner materials cannot satisfactorily be transferred by conventional electrostatographic development systems from reusable imaging surfaces in automatic copying and duplicating machines. In the past, these toner materials have generally been prepared by thoroughly mixing the heat-softened resin and pigment to form a uniform dispersion as by blending these ingredients in a rubber mill or the like and then pulverizing this mixture after cooling to form it into small particles. Physical blending of the colorants with the heat-softened resin inherently involves difficulties in achieving complete dispersion, sufficient blending or homogeneity, and surface uniformity. It would be highly desirable to have an improved electrostatographic toner composition inherently having improved triboelectric and physical characteristics resulting from the elimination of these manufacturing and composition disadvantages. Since most polymeric toner materials are deficient in one or more of the above areas, there is a continuing need for improved toners and developers.

It is, therefore, an object of the invention to provide toner compositions overcoming the above-noted deficiencies.

It is another object of this invention to provide a method for controllably altering the triboelectric values of toner materials without markedly changing the physical and chemical properties of the original polymer material.

It is a further object of this invention to provide toner material manufacturing techniques for producing developer materials having finely-adjusted triboelectric properties.

It is another object of this invention to provide toner materials which have minimized colorant bleeding or migration properties.

It is a further object of this invention to provide toner materials whose colorant species are metabolically inaccessible and thereby comprise non-toxic colored toner compositions.

It is further object of this invention to provide homogeneous colorant materials suitable for use as electrostatographic developer materials.

It is another object of this invention to provide toner fabrication methods which eliminate the need to physically disperse the colorants with the resinous materials.

It is a further object of this invention to provide a process for developing electrostatic latent images using the novel developer materials of this invention.

It is another object of this invention to provide developer materials having triboelectric properties which are superior to known toner and developer materials.

The foregoing objects and others are accomplished, generally speaking, by the controlled chemical alteration of the triboelectric charging potential of functional polymers employed as toner materials. The controlled variation of the triboelectric behavior of functional polymers provides a means of attaining optimum optimum triboelectric responses of electrostatographic developer materials for specifically defined applications. Thus, in accordance with this invention, monomeric and/or polymeric materials are systematically chemically modified to provide structural effects which yield structure-triboelectric property relationships among amine, amides, alcohols, esters, urethanes, silyl ethers, nitroaromatics, haloaromatics, aromatic ethers and alkyl aromatics. These relationships have been found to be extremely helpful in designing new toners. By this invention, the triboelectric charging properties of toner-carrier pairs are controlled to enable optimum triboelectric relationships in developer compositions.

It is to be noted that, by itself, no material has a triboelectric charge. The magnitude of a triboelectric charge depends upon both toner and the carrier material. Thus, alteration of one of the components to optimize triboelectric charging properties is generally necessary to provide the desired triboelectric response between the two materials. By so doing, greater latitude is available for specific electrostatographic applications. In accordance with this invention, it has been found that by varying the degree of chemical modification of polymeric materials for use as toner particles, either stoichiometrically or kinetically, the triboelectric properties of developer materials can be controlled in a continuous manner.

In electrostatographic development, polymers which tend to take on a relatively high negative charge are generally satisfactory for use as toner materials. In accordance with this invention, the triboelectric properties of developer materials are correlated with their structural composition and thereby predictably controlled. Since the distance between a given toner-carrier pair on a triboelectric charging scale is proportional to the triboelectric charge between them, their relative positions determines the sign of the triboelectric charge. Those materials low on the scale prefer to adopt a positive charge and those materials high on the scale prefer to adopt a negative charge. Once an acceptable value of triboelectric charge of a toner material for a given electrostatographic machine developer housing has been established, appropriate toner-carrier pairs can be selected based on their triboelectric charging relationship to satisfy a particular acceptable triboelectric charging range requirement.

It has been found that triboelectric behavior is a function of molecular structure which now allows the controlled and progressive modification of the triboelectric charging properties of toner compositions so as to obtain optimum triboelectric charging properties between toner and carrier pairs. Thus, by this invention, adjustment of the triboelectric charging properties of electrostatographic developer materials need not be done in stepwise fashion but may be accomplished in a continuous manner providing a high degree of "fine tuning of triboelectric properties for developer materials".

In accordance with this invention, the triboelectric charging properties of monomeric and polymeric aromatics may be modified by systematic chemical modification through reaction of their aromatic and ester functions. In one embodiment of this invention, polymers may be functionalized by means of aminolysis of their pendant ester functions with aminoalcohols. In another embodiment, polymers having aromatic groups with electron releasing or withdrawing substituents may be provided by known chemical processes. Cascade development triboelectric charging evaluations of such functionalized polymers have demonstrated that electron withdrawing substituents as measured by substituent constants increase the propensity for negative charging in aromatic systems. In another embodiment of this invention modification of the triboelectric charging properties of monomeric and polymeric aromatics may be accomplished by double substitution such as combined nitration-oxidation of the aromatics. It has been found that the triboelectric charge acquired by the nitrated aromatic is much more negative than the non-nitrated polymer material. It is further noted that a standard nitration procedure usually yields a polymer which does not charge as negatively even though the degree of nitration is comparable. In addition, the oxidation further increases the extent of negative triboelectric charging propensity of polymeric toner materials. For example, it has been found that nitration of a styrene-n-butylmethacrylate copolymer material, employed conventionally in toner compositions, yields a polymer whose charge exchange properties enables its use as a toner material with various carriers below it in the work function series including "reversal" carriers. The degree of nitration or nitration-oxidation can be controlled either stoichiometrically or kinetically so as to optimize salient physical and triboelectric properties. Typically, any suitable nitration process may be employed to provide the chemically modified toners of this invention. Typical nitration processes include the use of a mild, non-hydrolytic process employing reagents such as cupric nitrate and acetic anhydride, for example, when polymers are hydrolytically unstable under usual nitration conditions.

In another embodiment of this invention functionalized polymers may be obtained for use as toner materials via silylation. This chemical process leads to changes in the triboelectric behavior of active hydrogen containing materials. The process also allows for controlled variation of triboelectric behavior in a continuous fashion. Thus, silylation of hydroxyl moieties of polymer materials is a means of obtaining such effect. Generally speaking, the passing of a silylating reagent in a stream of inert gas through a solid bed of hydroxylic material accomplishes silylation. The depth or amount of silylation will depend, to some extent, on the permeability of the silylation reagent through the solid. For some toner material applications, surface reaction may be sufficient. However, silylation reactions in solution will generally lead to more homogeneous reaction which may be advantageous for some toner applications. In either case, the degree of silylation may be controlled either stoichiometrically or kinetically, making available a continuous range of toner materials having variously controlled triboelectric properties. Further, this invention is not limited to the silylation of hydroxyl moieties of polymer materials, but extends as well to the silylation of other active hydrogen containing compounds such as carboxylic acid, phenols, mercaptans, amines, amides and the like. Thus, this invention provides a means of effecting monitored silicon additions to polymer materials by the addition of organic silicon moieties to effect desired and controlled triboelectric properties thereto. The silicon units may be introduced either as terminal groups or as block copolymer components. Therefore, this method affords a means for systematically varying the triboelectric charging relationship of toner-carrier developer compositions by either surface treatment of the materials or by chemical modification of toner materials prior to their fabrication to provide controlled triboelectric behavior of such materials.

It has been further found that for aliphatic hydroxyls, silylation causes the material to accept more negative triboelectric charge. Thus, for a toner material candidate, the desired negative triboelectric charge will be improved. Some of the advantages of this embodiment include the facile reaction of solid hydroxylic substrates with gaseous silylation reagents. In addition, the conversion of hydroxyl moieties to silyl ether moieties may be controlled in a continuous fashion thus allowing the "fine-tuning" of triboelectric properties of developer compositions. Thus, the invention may be employed to increase or decrease the net triboelectric charge to the requisite level of toner-carrier pairs.

In general, any method such as for preparing silyl ethers is within the scope of this invention. Any suitable silylating agent may be employed to obtain the functionalized toner materials of this invention. Typical silylating agents include dimethylaminotrimethylsilane, trimethyl- and dimethyl- chloro- silanes and polysiloxanes with reactive terminal moieties.

In addition to these transformations, functionalized polymers may be further derivatized. For example, an aminolyzed polymer having the general structure where X may be $NH_2$, OH, $NHCOC_6H_4R$, $OCOC_6H_4R$ and H provides polymer compositions of varying triboelectric charging potentials. More specifically, conversion of the $NH_2$ group to a benzamide (X = $NHCOC_6H_4R$) causes the polymer to accept more negative charge. The R groups in the aforementioned general structure are electron donating or electron releasing substituents as exemplified by the Hammett series of substituents. Such Hammett substituents are frequently used in chemistry to assess and modify the chemical reactions jof a central functional group (such as the amide group here). It has now been found that these substituent effects are likewise able to influence the nature and the degree of electrical charge exchange. Thus an orderly process of modifying charge exchange properties has been generated.

It is also noted that the triboelectric charging capacity is controlled by the substituent R of benzoates (X = $OCOC_6H_4R$). As with amides, the propensity for negative charging increases with increasing electron withdrawing power of R as measured by substituent constants in each case.

It has also been found that introduction of electron withdrawing groups into the aromatic moieties of polymers such as polystyrene and styrene-n-butyl methacrylate copolymers causes an increase in their propensity for negative charging. Conversely, introduction of electron releasing moieties decreases their propensity for negative charging. Thus, the triboelectric properties of polymers containing aromatic moieties may be altered by chemical modification. The chemical modification encompasses the attachment of functionality to the aromatic nucleus. Preferred chemical modification approaches include one step transformation such as nitration, hydroxylation, halogenation, sulfonation, alkylation, and acylation. An alternative to reactions of polymers in many applications is the polymerization of aromtic monomers bearing the desired substituent. Bromination of polymers having aromatic ester functions such as available phenyl groups was also found to yield polymers which acquire considerably more negative triboelectric charge than the untreated polymers. The aforementioned techniques may be applied to many polymers such as those disclosed above and their derivatives including polyesters, styrene-alkylmethacrylates alkyl acrylates, terephthalate polyesters, and phenolformaldehyde polymers.

The use of functional moieties further includes covalent bonding of the functionalized polymers to dyes, the attachment of triboelectric charging modifiers, and bonding to substrates. Thus, in accordance with this invention, it is possible to predict and control the triboelectric and physical characteristics of toner materials, and prepare such toner materials that desirable electrostatographic properties are intrinsic to the composition and need not depend upon external additives. Therefore, a further aspect of this invention is to provide a method of controllably producing a functionalized polymer with a specific number of reactive sites for dyeing. The reactive group may be employed to covalently attach dyes thereto and to covalently attach triboelectric charging modifiers where so desired.

Thus, in accordance with this invention, colored toner materials may be provided which alleviate the problems associated with the instability of physical mixtures of dyes and pigments with monomeric and/or polymeric resinous materials. These problems include "bleeding" of the colorant from the toner, difficulty in obtaining homogeneous dispersions of colorant, non-transparency, and poorly controlled triboelectric properties. These problems are essentially eliminated by chemically modifying monomeric and/or polymeric resinous materials employed in preparation of toner materials to yield monomers and/or polymers containing structural units which can be covalently dyed with reactive dyes. A further advantage is the metabolic inaccessibility of the polymerically bound dye moieties to humans. In the case of dispersed dyes, toxicity is a serious problem. By providing a method of controllably producing a functionalized polymer with a specific number of reactive sites for dyeing the reactive group may be employed to covalently attach dyes and to covalently attach triboelectric property modifiers to obtain improved toner materials. In addition, the number of functional groups available for dyeing at a given degree of chemical modification of the monomeric and-/or polymeric resinous materials may be increased by providing branching substituents. For example, a copolymer of styrene-n-butylmethacrylate may be aminolyzed with various amines such as N-(3-aminopropyl)-diethanolamine and N-(2-aminoethyl)ethanolamine providing products which are bifunctional toward certain dyes resulting in increased dyeability. The ability to achieve increased dyeability at a given degree of chemical modification, such as by aminolysis, has obvious advantages. It is possible to employ one of the functionalities for covalent dyeing and the other for attachment of triboelectric property modifiers. Thus resinous materials which do not readily lend themselves to covalent dyeing, such as the copolymer of styrene-n-butyl methacrylate, may be modified for attachment of dyes containing various linking groups by introducing to the resinous material a suitable nucleophilic site via chemical modification of the ester groups such as with a bifunctional amine via aminolysis. It has been found that chemical conversion of these resinous materials into covalently dyed toner species yield materials which are chemically homogeneous and provide fused electrostatographic images with improved properties alleviating the aforementioned problems with conventional toner materials.

More specifically, in accordance with this invention, it is possible to prepare polymers with pendant dye moieties through coupling of a reactive dye to a functional polymer such as one containing hydroxyl groups.

Suitable reactive dyes include those of structural classes such as those wherein chlorotriazinyl moieties react with the hydroxyls to form triazinyl ethers. Typical reactive dyes include the Procion dyes such as Brilliant Red M2BS, Brilliant Red, M5BS, Brilliant Red H3BS, Brilliant Red M8BS, Brilliant Red H3BNS, Brilliant Red H8BS, Brilliant Red H7BS, Brilliant Red H8BNS, Red MGS, Red MBCA, Red MBA, Scarlet MGS, Scarlet HRS, Scarlet HRNS, Scarlet M2BA, Scarlet MBA, Scarlet H2GS, Brilliant Purple H3RS, Rubine MBS, Rubine HBS, Black HGSA and the like.

It has been found that polymeric colorants, that is, covalently dyed polymers, alleviate many problems associated with monomeric colorants. One of the most important advantages of such covalently dyes polymer toner materials is the stability of such toners to "bleeding" or color migrations, either in the developer or on the copy. The lack of "bleeding" has been demonstrated by exposing dyed polymers to ethanol solvent. By comparison, toner materials prepared by mixing the same dyes and non-functionalized polymers are readily extracted by solvents. Obvious advantages of these covalently dyed polymers as toners include the elimination of mixing problems of dye with a suitable polymer such as by blending where typically poor homogeneity is obtained. In contradistinction, homogeneity results from the dyeing reaction itself. Such homogeneity leads to greater transparency in the fused toner, an obvious advantage for transparency projection. Further, the degree of homogeneity of blended systems also affects its triboelectric properties. Since triboelectric charging capacity is a surface property, whether the colorant resides at the surface of a toner particle or not, is most important in dispersed systems. Triboelectric response is a function of the surface, and in dispersed systems the desired component is sometimes at the surface, and sometimes not. In single component systems, while one portion of the polymer may prefer to be at the surface, the chemical bonds cause such large constraints generally that surface segregation is not manifested and triboelectric response is a direct function of degree of conversion of the polymer. It has been found that it is now possible to predict the triboelectric response of a polymer based on its degree of chemical conversion. Thus it is now possible to predict the relative triboelectric charging properties of homologous series and also to incorporate triboelectric-activating groups into convalently dyed polymers to provide them with desired triboelectric charging properties. Since triboelectric response is a linear function of the degree of conversion for reacton of most polymers, such allows for continuous control of triboelectric properties in colored toners. It should be noted that another important advantage of polymeric colorants for use as toner materials is that they can be prepared by spray-drying methods, a mode of manufacturing which is quite difficult with multiphase systems.

The toner materials of this invention may be prepared by any suitable method. There are various approaches to obtaining dyed polymers including, but not limited to, direct polymerization with the dye in the polymer backbone, direct polymerization with the dye pendant, or post polymerization attachment. The preferred method of preparing the toner materials of this invention is by direct polymerization or copolymerization of a reactive polymer. In this way, a small and controlled amount, for example, about 5 to about 15 mole percent, of reactive functionality may be introduced. A dye may then be attached to the reactive functionality to the extent desired. The remaining reactive groups may be reacted with another reagent to enhance the triboelectric properties of the toner materials. With respect to dye attachment, many of the reactions in solid phase peptide synthesis using reactive resins are applicable. As previously indicated, polystyrene may be acylated under Friedel-Crafts conditions enabling the preparation of p-benzoyl derivatives which may be reduced to the benzhydrols and these may be converted to benzhydryl chlorides and bromides, all being in resin form. The halides are very reactive and may be used for attachment of the dye.

The reactions of functional groups attached to polymers are frequently subject to steric influences such as hindrance caused by the proximity of reactive groups to the main polymer chain. Thus, polymers carrying 2-hydroxyethylamide side chains are found to be difficult to dye, while polymers carrying 6-hydroxyhexylamide moieties accept convalent dyes very readily. Likewise, 2-aminoethylamide side chains resist dye attachment, while 6-aminohexylamide side chains are dyed readily and to completion. There is no definite cut-off chain length for the "leash", but maximum conversion can usually not be reached unless at least about 3 methylene or other linking groups separate the polymer attachment group from the dye attachment group.

Therefore, the triboelectrically controlled convalently dyed toner materials of this invention may be the products of aminolysis, nitration, nitration-oxidation, silylation, and acylation of any monomer, polymer, or copolymer containing suitable aromatic or aliphatic functionalities. The chemical modification of such materials enables the preparation of materials having optimum physical properties in such a way as to improve their triboelectric properties for electrostatographic use. This invention may serve as a guide for the preparation of toner compositions having "finely-tuned" triboelectric charging properties, and the capacity for continuous control of such properties through variation in extent of reaction may be employed for such purpose.

Any suitable vinyl resin having a melting point of at least about 110° F may be employed in the toners of this invention. The vinyl resin may be a homopolymer or a copolymer of two or more vinyl monomers. Typical monomeric units which may be employed to form vinyl polymers include: styrene, p-chlorostyrene; vinyl naphthalene; ethylenically unsaturated mon-olefins such as ethylene, propylene, butylene, isobutylene and the like; vinyl esters such as vinyl chloride, vinyl bromide, vinyl fluoride, vinyl acetate, vinyl propionate, vinyl benzoate, vinyl butyrate and the like; esters of alphamethylene aliphatic mnocarboxylic acids such as methyl acrylate, ethyl acrylate, n-butyl acrylate, isobutyl acrylate, dodecyl acrylate, n-octyl acrylate, 2-chloroethyl acrylate, phenyl acrylate, methylalpha-chloroacrylate, methyl methacrylate, ethyl methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl compounds such as N-vinylpyrrole, N-vinylcarbazole, N-vinylindole, N-vinylpyrrolidone and the like; and mixtures thereof. Generally, suitable vinyl resins employed in the toner have a weight average molecular weight between about 3,000 to about 500,000.

The resins may be fomed by polymerization of mixtures of two or more of these unsaturated monomeric materials. The expression "addition polymerization" is intended to include known polymerization techniques such as free radical, anionic and cationic polymerization processes.

The vinyl resins, including styrene type resins, may also be blended with one or more other resins if desired. When the vinyl resin is blended with another resin, the added resin is preferably another vinyl resin because the resulting blend is characterizied by especially good triboelectric stability and uniform resistance against physical degradation. The vinyl resins employed for blending with the styrene type or other vinyl resin may be prepared by the addition polymerization of any suitable vinyl monomer such as the vinyl monomers described above. Other thermoplastic resins may also be blended with the vinyl resins of this invention. Typical non-vinyl type thermoplastic resins include: rosin modified phenol formaldehyde resins, oil modified epoxy resins, polyurethane resins, cellulosic resins, polyether resins and mixtures thereof.

The toner compositions of the present invention may be prepared by any well-known toner mixing and comminution technique. For example, the ingredients may be thoroughly mixed by blending, mixing and milling the components and thereafter micropulverizing the resulting mixture. Another well-known technique for forming toner particles is to spray-dry a ball-milled toner composition comprising the covalently dyed resin and a solvent.

When the toner materials of this invention are to be employed in a cascade development process, the toner should have an average particle size less than about 30 microns and preferably between about 4 and about 20 microns for optimum results. For use in powder cloud development methods, particle diameters of slightly less than 1 micron are preferred.

Suitable coated and uncoated carrier materials for cascade development are well-known in the art. The carrier particles comprise any suitable solid material, provided that the carrier particles acquire a charge having an opposite polarity to that of the toner particles when brought in close contact with the toner particles so that the toner particles adhere to and surround the carrier particles. When a positive reproduction of the electrostatic images is desired, the carrier particle is selected so that the toner particles acquire a charge having a polarity opposite to that the the electrostatic image. Alternatively, if a reversal reproduction of the electrostatic image is desired, the carrier is selected so that the toner particles acquire a charge having the same polarity as that of the electrostatic image. Thus, the materials for the carrier particles are selected in accordance with their triboelectric properties in respect to the electrostatic toner so that when mixed or brought into mutual contact, one component of the developer is charged positively if the other component is below the first component in the triboelectric series and negatively if the other component is above the first component in a triboelectric series. By proper selection of carrier materials in accordance with their triboelectric effects, the polarities of their charge, when mixed, are such that the electroscopic toner particles adhere to and are coated on the surfaces of carrier particles and also adhere to that portion of the electrostatic image-bearing surface having a greater attraction for the toner than the carrier particles. Typical carries include sodium chloride, ammonium chloride, aluminum potassium chloride, Rochelle salt, sodium nitrate, aluminum nitrate, potassium chlorate, granular silicon, methylmethacrylate, glass, silicon dioxide, nickel, steel, iron, ferrites, and the like. The carriers may be employed with or without a coating. Many of the foregoing and other typical carriers are described are described by L. E. Walkup et al. in U.S. Pat. No. 2,638,416 and E. N. Wise in U.S. Pat. No. 2,618,552. An ultimate coated carrier particle diameter between about 50 microns to about 1,000 microns is preferred because the carrier particles then possess sufficient density and inertia to avoid adherence to the electrostatic images during the cascade development process. Adherence of carrier beads to electrostatographic drums is undesirable because of the formation of deep scratches on the surface during the imaging transfer and drum cleaning steps, particularly where cleaning is accomplished by a web cleaner such as the web disclosed by W. P. Graff, Jr., et al. in U.S. Pat. No. 3,186,838. Also print deletion occurs when carrier beads adhere to electrostatographic imaging surfaces. Generally speaking, satisfactory results are obtained when about 1 part toner is used with about 10 to 200 parts by weight of carrier.

The toner compositions of the instant invention may be employed to develop electrostatic latent images on any suitable electrostatic latent image-bearing surface including conventional photoconductive surfaces. Well-known photoconductive materials include vitreous selenium organic or inorganic photoconductors embedded in a non-photoconductive matrix, organic or inorganic photoconductors embedded in a photoconductive matrix, or the like. Representative patents in which photoconductive materials are disclosed include U.S. Pat. No. 2,903,542 to Ullrich, U.S. Pat. 2,970,906 to Bixby, U.S. Pat. No. 3,121,006 to Middleton, U.S. Pat. No. 3,121,007 to Middleton, and U.S. Pat. No. 3,151,982 to Corrsin.

DESCRIPTION OF PREFERRED EMBODIMENTS

The following examples further define, describe, and compare methods of preparing the toner materials of the present invention and of utilizing them to develop electrostatic latent images. Parts and percentages are by weight unless otherwise indicated.

In the following, the relative triboelectric values generated by contact of carrier beads with toner particles is measured by means of a cascade device. The device comprises a grounded metal plate set at an arbitrary but constant angle of elevation to horizontal, for example, 30°, and a cup at the bottom of the incline. The cup is not attached to the incline and is thus not grounded; it is attached to an electrometer. The material to be tested is coated onto a metallic sheet, such as aluminum, and this is attached to the incline. Then beads of the desired carrier material are cascaded down the film and into the electrometer cup, where the charge acquired by the beads is measured. From this quantity and the weight of the beads the charge to mass ratio is calculated. This quantity is a direct measure of the triboelectric charging capacity of the polymeric film. The measurement is done at constant relative humidity and temperature. Since triboelectric measurements are relative, the measurements should, for comparative purposes, be conducted under substantially identical conditions.

EXAMPLE I

Functionalized polymers were prepared for covalently dyed toner materials by ester group aminolysis of a styrene-n-butyl methacrylate copolymer (2.54:1.00 mole ratio) with an aminoalcohol resulting in formation of hydroxyalkylamide functions.

A mixture of about 117.5 grams (0.289 mole of ester functions based on elemental analysis of the styrene-n-butyl methacrylate, about 41.0 grams (0.350 mole) of 6-aminohexanol, and about 39.3 grams (0.350 mole) of 1,4-diazabicyclo(2,2,2)octane was stirred under dry nitrogen at about 180° C (oil bath temperature 205° C) using an ambient air-cooled condenser to allow escape of the N-butanol produced. Samples were removed periodically, quenched in 10% HCl by weight, and purified as follows. Each sample was dissolved in tetrahydrofuran and then 10% HCl was added. The liquid phase was decanted from the gummy polymer. This process was repeated twice, followed by a fourth and fifth wash using 5% methanolic HCl. The polymer was taken up in tetrahydrofuran and precipitated by dropwise addition with rapid stirring to 10% HCl. After homogenization in a blender and filtration, the process was repeated. The polymer in tetrahydrofuran solution was then precipitated in like manner from deionized water, and this process repeated. After a final precipitation from methanol, the sample was dried in vacuo. Generally, the polymer sample was dissolved in about five times its weight of tetrahydrofuran. Volumes of the precipitating solutions were 6-10 times those of the polymer-tetrahydrofuran solution.

Figure 1:
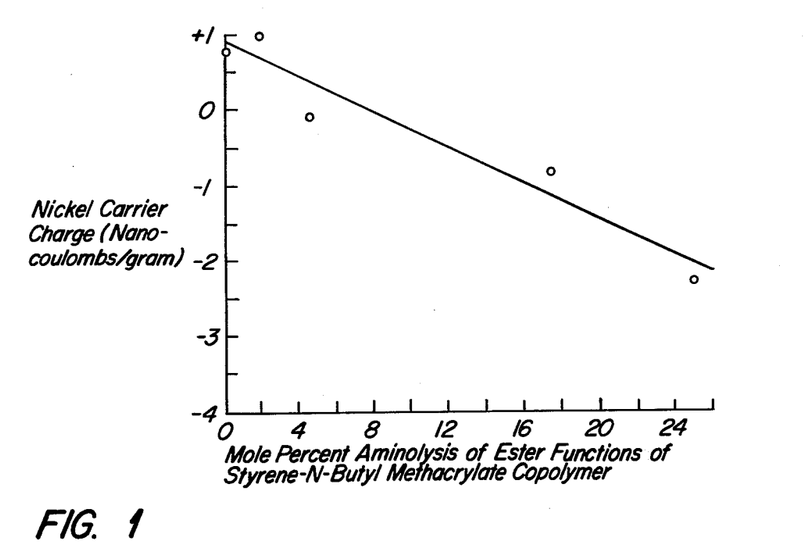

Following the above procedure to obtain functionalized polymers by aminolysis, the ester functions of styrene-n-butyl methacrylate copolymer (2.54:1.00 mole ratio) were aminolyzed with 6-aminohexanol from 0 to 25 1 mole percent of available ester functions and films were cast from solution onto aluminum plates and thoroughly dried. FIG. 1 illustrates the dependence of triboelectric charging on the degree of conversion of the functionalized copolymer when using 250 micron nickel beads as a carrier. Other carriers gave similar results.

EXAMPLE II

The functionalized polymers as prepared in Example I are employed as intermediates for covalently dyed toners. In one sample dyeing of the functionalized polymer was accomplished by taking a mixture of about 1.5 grams of the polymer and about 1.5 grams of Procion M5BS, a red ($\lambda$ max 537, 512 m$\mu$, H$_2$O) reactive, i.e., chloro-s-triazine type, dye available from I.C.I. Organics, Inc., Providence, R.I., and about 1 ml. pyridine in about 25 ml. dimethylformamide. The mixture was sealed to the atmosphere and heated on a steam bath for 15-20 hours. The Procion M5BS is not completely soluble as it contains some inorganic salts. The polymer was then precipitated from about 400 ml. deionized water. After filtration the polymer was washed on a Buchner funnel with deionized water until little of the water-soluble dye was evident in the wash. The polymer was dissolved in about 20 ml. tetrahydrofuran and precipitated by dropwise addition with rapid stirring to about 200 ml. deionized water. The precipitate was filtered until the filtrate was colorless. Then the polymer was washed on the funnel with about 20 ml. 10% HCl to convert sulfonic acid salt groups on the dye moiety to the acid form followed by washing with about 500 ml. water and about 500 ml methanol. The sample was then dried in vacuo. By comparison, it is noted that unreacted starting material is not changed by this procedure and is not dyed.

Figure 2:
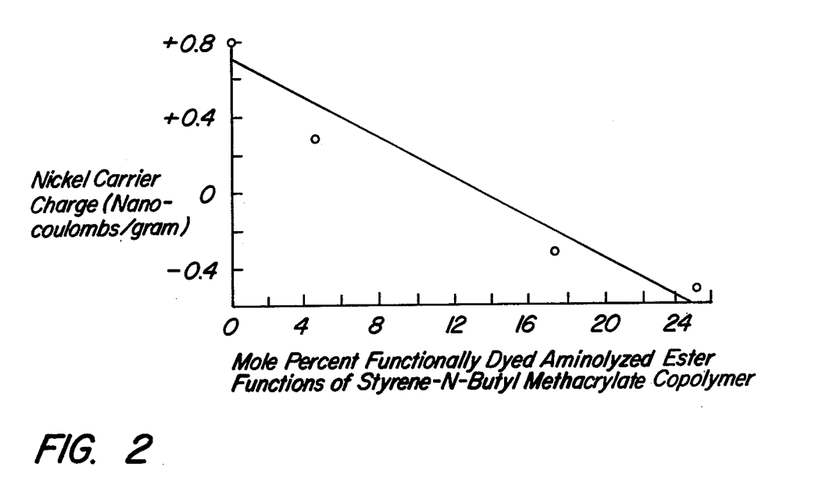

Following the procedure of Example I, the correspondingly amminolyzed and covalently dyed polymers were cast a films from solution onto aluminum plates and thoroughly dried. FIG. 2 illustrates that the triboelectric charging properties of these polymers are nearly identical with those of Example I except that the magnitude of triboelectric charging changes. As in Example I, the values obtained are when using 250 micron nickel beads as a carrier. It is seen in FIG. 2 that the triboelectric charging properties of these materials is dependent upon the mole percent functionally dyed, amminolyzed ester groups of the styrene-n-butyl methacrylate copolymer.

EXAMPLE III

Functionalized polymers were prepared for convalently dyed toner materials by ester group aminolyzed of a stryene-n-butyl methacrylate copolymer (2.54:1.00 mole ratio). A mixture of about 117.5 grams (0.289 mole of ester functions based on elemental analysis) of the styrene-n-butyl methacrylate, about 47.1 1 grams of N-(3-aminopropyl)diethanolamine, and about 32.6 grams of 1,4-diazabicyclo(2,2,2)octane was stirred under dry nitrogen at about 180° C (oil bath temperature 205° C) using an ambient air-cooled condenser to allow escape of the butanol produced. Samples were removed periodically, quenched in 10% HCl by weight and purified as in Example I. The functionalized polymer was employed as an intermediate for covalently dyed toners. Dyeing of the functionalized polymer was accomplished by taking a mixture of about 1.5 grams of the polymer and about 1.5 grams of Procion M5BS, a red ($\lambda$ max 537,512 m$\mu$, H$_2$O) reactive, i.e., chloro-s-triazine type, dye available from I.C.I. Organics, Inc., Providence, R.I., and about 1 ml. pyridine in about 25 ml. dimethylformamide. The mixture was sealed to the atmosphere and heated on a steam bath for 15-20 hours. The Procion M5BS is not completely soluble as it contains some inorganic salts. The polymer was then precipitated from about 400 ml. deionized water. After filtration the polymer was washed on a Buchner funnel with deionized water until little of the watersoluble dye was evident in the wash. The polymer was dissolved in about 20 ml. tetrahydrofuran and precipitated by dropwise addition with rapid stirring to about 200 ml. deionized water. The precipitate was filtered until the filtrate was colorless. Then the polymer was washed on the funnel with about 20 ml. 10% HCl to convert sulfonic acid salt groups on the dye moiety to the acid form followed by washing with about 500 ml. water and about 500 ml. methanol. The sample was then dried in vacuo. By comparison, it is noted that unreacted starting material is not changed by this procedure and is not dyed.

Following the procedure of Example I, the correspondingly amminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carrier. It was also found that the triboelectric charging properties of these materials is dependent upon the mole percent functionally dyed, aminolyzed ester groups of the styrene-n-butyl methacrylate copolymer.

EXAMPLE IV

Functionalized polymers were prepared for covalently dyed toner materials by ester group aminolysis of styrene-N-butyl methacrylate. A mixture of about 117.5 grams (0.289 mole of ester functions based on elemental analysis) of the styrene-n-butyl methacrylate, about 30.2 grams of N-(2-aminoethyl)ethanolamine, and about 32.6 grams of 1,4-diazabicyclo(2,2,2)octane was stirred under dry nitrogen at about 180° C (oil bath temperature 205° C) using an ambient air-cooled condenser to allow escape of the butanol produced. Samples were removed periodically, quenched in 10% HCl by weight, and purified as in Example I.

The functionalized polymer was employed as an intermediate for covalently dyed toners. Dyeing of the functionalized polymer was accomplished by taking a mixture of about 1.5 grams of the polymer and about 1.5 grams of Procion M5BS, a red ($\lambda$ max 537,512 1 m$\mu$, $H_2O$) reactive, i.e., chloro-s-triazine type, dye available from I.C.I. Organics, Inc., Providence, R.I., and about 1 ml. pyridine in about 25 ml. dimethylformamide. The mixture was sealed to the atmosphere and heated on a steam bath for 15-20 hours. The Procion M5BS is not completely soluble as it contains some inorganic salts. The polymer was then precipitated from about 500 ml. deionized water. After filtration the polymer was washed on a Buchner funnel with deionized water until little of the water-soluble dye was evident in the wash. The polymer was dissolved in about 20 ml. tetrahydrofuran and precipitated by dropwise addition with rapid stirring to about 200 ml. deionized water. The precipitate was filtered until the filtrate was colorless. Then the polymer was washed on the funnel with about 20 ml. 10% HCl to convert sulfonic acid salt groups on the dye moiety to the acid form followed by washing with about 500 ml. water and about 500 ml. methanol. The sample was then dried in vacuo. By comparison, it is noted that unreacted starting material is not changed by this procedure and is not dyed.

Following the procedure of Example I, the corresponding aminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carrier. It was also found that the triboelectric charging properties of these materials is dependent upon the mole percent functionally dyed, aminolyzed ester groups of the styrene-n-butyl methacrylate copolymer.

EXAMPLE V

Functionalized polymers were prepared for covalently dyed toner materials by ester group aminolysis of a styrene-n-butyl methacrylate copolymer (2.54:1.00 mole ratio). A mixture of about 117.5 grams (0.289 mole of ester functions based on elemental analysis) of the styrene-n-butyl methacrylate, about 41.0 grams of 1,6 hexanediamine and about 39.3 grams (0.350 mole) of 1,4-diazabicyclo(2,2,2)octane was stirred under dry nitrogen at about 180° C (oil bath temperature 205° C) using an ambient air-cooled condenser to allow escape of the butanol produced. Samples were removed periodically quenched in 10% HCl by weight, and purified as in Example I.

The functionalized polymer was employed as an intermediate for covalently dyed toners. Dyeing of the functionalized polymer was accomplished by taking a mixture of about 1.5 grams of the polymer and about 1.5 grams of Procion M5BS, a red ($\lambda$ max 537,512 mu, $H_2O$) reactive, i.e., chloro-s-traizine type, dye available from I.C.I. Organics, Inc., Providence, R. I., and 1 ml. pyridine in about 25 ml. dimethylformamide. The mixture was sealed to the atmosphere and heated on a steam bath for 15-20 hours. The Procion M5BS is not completely soluble as it contains some inorganic salts. The polymer was then precipitated from about 400 ml. deionized water. After filtration the polymer was washed on a Buchner funnel with deionized water until little of the water-soluble dye was evident in the wash. The polymer was dissolved in about 20 ml. tetrahydrofuran and precipitated by dropwise addition with rapid stirring to about 200 ml. deionized water. The precipitate was filtered until the filtrate was colorless. Then the polymer was washed on the funnel with about 20 ml. 10% HCl to convert sulfonic acid salt groups on the dye moiety to the acid form followed by washing with about 500 ml. water and about 500 ml. methanol. The sample was then dried in vacuo. By comparison, it is noted that unreacted starting material is not changed by this procedure and is not dyed.

Following the procedure of Example I, the correspondingly aminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carrier. It was also found that the triboelectric charging properties of these materials is dependent upon the mole percent functionally dyed, aminolyzed ester groups of the styrene-n-butyl metacrylate copolymer.

EXAMPLE VI

Functionalized polymers were prepared for covalently dyed toner materials by ester group amminolysis of a styrene-n-butyl methacrylate copolymer (2.54:100 mole ratio) with an aminoalcohol resulting in formation of hydroxyalkylamide functions. A mixture of about 117.5 grams (0.289 mole of ester functions based on elemental analysis) of the styrene-n-butyl metahcrylate, about 41.0 grams (0.350 mole) of 6-aminohexanol, and about 39.3 grams (0.350 mole) of 1,4-diazabicyclo(2,2,2-)octane was stirred under dry nitrogen at about 180° C (oil bath temperature 205° C) using an ambient air-cooled condenser to allow escape of the n-butanol produced. Samples were removed periodically, quenched in 10% HCl by weight, and purified as in Example I.

The functionalized polymer was employed as an intermediate for covalently dyed toners. Dyeing of the functionalized polymer was accmplished by taking a mixture of about 1.5 grams of the polymer and about 1.5 grams of Procion Black HGSA, a black reactive, i.e., chloro-s-triazine type, dye available from I.C.I. Organics, Inc., Providence, R. I., and about 1 ml. pyridine in about 25 ml. dimethylformamide. The mixture was sealed to the atmosphere and heated on a steam bath for 15-20 hours. The Procion Black HGSA is not completely soluble as it contains some inorganic salts. The polymer was then precipitated from about 400 ml. deionized water. After filtration the polymer was washed on a Buchner funnel with deionized water until little of the water soluble dye was evident in the wash. The polymer was dissolved in about 20 ml. tetrahydrofuran and precipitated by dropwise addition with rapid stirring to about 200 ml. deionized water. The precipitate was filtered until the filtrate was colorless. Then the polymer was washed on the funnel with about 20 ml. 10% HCl to convert sulfonic acid salt groups on the dye moiety to the acid form followed by washing with about 500 ml. water and about 500 ml. methanol. The sample was then dried in vacuo. By comparison, it is noted that unreacted starting material is not changed by this procedure and is not dyed.

Following the procedure of Example I, the correspondingly aminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carier. It was also found that the triboelectric charging properties of these materials is dependent upon the mole percent functionally dyed, aminolyzed ester groups of the styrene-n-butyl methacrylate copolymer.

EXAMPLE VII

Functionalized polymer were prepared for covalently dyed toner materials by ester group aminolysis of a styrene-n-butyl methacrylate copolymer (2.54:1.00 mole ratio) with an aminoalcohol resulting in formation of hydroxyalkylamide functions. A mixture of about 117.5 grams (0.289 mole of ester functions based on elemental analysis) of the styrene-n-butyl methacrylate, about 41.0 grams (0.350 mole) of 6-aminohexanol, and about 39.3 grams (0.350 mole) of 1,4-diazabicyclo(2,2,2) octane was stirred under dry nitrogen at about 180° C (oil bath temperature 205° C) using an ambient air-cooled condenser to allow escape of the n-butanol produced. Samples were removed periodically, quenched in 10% HCl by weight, and purified as in Example I.

The functionalized polymer was employed as an intermediate for covalently dyed toners. Dyeing of the functionalized polymer was accomplished by taking a mixture of about 1.5 grams of the polymer and about 1.5 grams of Procion Brilliant Red M8BS, a red ($\lambda$ max 546, 518 mu, $H_2O$) reactive, i.e., chloro-s-triazine type, dye available from I.C.I. Organics, Inc., Providence, R. I., and about 1 ml. pyridine in about 25 ml. dimethylformamide. The mixture was sealed to the atmosphere and heated on a steam bath for 15–20 hours. The Procion Brilliant Red M8BS is not completely soluble as it contains some inorganic salts. The polymer was then precipitated from about 400 ml. deionized water. After filtration the polymer was washed on a Buchner funnel with deionized water until little of the water soluble dye was evident in the wash. The polymer was dissolved in about 20 ml. tetrahydrofuran and precipitated by dropwise addition with rapid stirring to about 200 ml. deionized water. The precipitate was filtered until the filtrate was colorless. Then the polymer was washed on the funnel with about 20 ml. 10% HCl to convert sulfonic acid salt grouups on the dye moiety to the acid form followed by washing with about 500 ml. water and about 500 ml. methanol. The sample was then dried to vacuo. By comparison, it is noted that unreacted starting material is not changed by this procedure and is not dyed.

Following the procedure of Example I, the correspondingly aminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carrier. It was also found that the triboelectric charging properties of these materials is dependent upon the mole percent functionally dyed, aminolyzed ester groups of the styrene-n-butyl methacrylate copolymer.

EXAMPLE VIII

Functionalized polymers were prepared for covalently dyed toner materials by ester group aminolysis of a styrene-n-butyl methacrylate copolymer (2.54:1.00 mole ratio) with an aminoalcohol resulting in formation of hydroxyalkylamide functions. A mixture of about 117.5 grams (0.289 mole of ester functions based on elemental analysis) of the styrene-n-butyl methacrylate, about 41.0 grams (0.350 mole) of 6-aminohexanol, and about 39.3 grams (0.350 mole) of 1,4-diazabicyclo(2,2,2) octane was stirred under dry nitrogen at about 180° C (oil bath temperature 205° C) using an ambient air-cooled condenser to allow escape of the n-butanol produced. Samples were removed periodically, quenched in 10% HCl, by weight, and purified as in Example I.

The functionalized polymer was employed as an intermediate for covalently dyed toners. Dyeing of the functionalized polymer was accomplished by taking a mixture of about 1.5 grams of the polymer and about 1.5 grams of Procion Brilliant Purple H3RS, a purple ($\lambda$ max 552 mu, $H_2O$) reactive, i.e., chloro-s-triazine type, dye available from I.C.I. organics, Inc., Providence, R. I., and about 1 ml. pyridine in about 25 ml. dimethylformamide. The mixture was sealed to the atmosphere and heated on a steam bath for 15–20 hours. The Procion Brilliant Purple H3RS is not completely soluble as it contains some inorganic salts. The polymer was then precipitated from about 400 ml. deionized water. After filtration the polymer was washed on a Buchner funnel with deionized water until little of the water soluble dye was evident in the wash. The polymer was dissolved in about 20 ml. tetrahydrofuran and precipitated by dropwise addition with rapid stirring to about 200 ml. deionized water. The precipitate was filtered until the filltrate was colorless. Then the polymer was washed on the funnel with about 20 ml. 10% HCl to convert sulfonic acid salt groups on the dye moiety to the acid form followed by washing with about 500 ml. water and about 500 ml. methanol. The sample was then dried in vacuo. By comparison, it is noted that unreacted starting material is not changed by this procedure and is not dyed.

Following the procedure of Example I, the correspondingly aminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carrier. It was also found that the triboelectric charging properties of these materials is dependent upon the mole percent functionally dyed, aminolyzed ester groups of the styrene-n-butyl methacrylate copolymer.

EXAMPLE IX

Functionalized polymers were prepared for covalently dyed toner materials by ester group aminolysis of a styrene-n-butyl methacrylate copolymer (2.54:1.00 mole ratio) with an aminoalcohol resulting in formation of hydroxyalkylamide functions. A mixture of about 117.5 grams (0.289 mole of ester functions based on elemental analysis) of the styrene-n-butyl methacrylate, about 41.0 grams (0.350 mole) of 6-aminohexanol, and about 39.3 grams (3.50 mole) of 1,4-diazabicyclo(2,2,2) octane was stirred under dry nitrogen at about 180° C (oil bath temperature 205° C) using an ambient aircooled condenser to allow escape of the n-butanol produced. Samples were removed periodically, quenched in 10% HCl by weight, and purified as in Example I.

The functionalized polymer was employed as an intermediate for covalently dyed toners. Dyeing of the functionalized polymer was accomplished by taking a mixture of about 1.5 grams of the polymer and about 1.5 grams of Procion Brilliant Red, H8BNS, a red ($\lambda$ max 545, 520 mu, $H_2O$) reactive, i.e., chloro-s-triazine type, dye available from I.C.I. Organics, Inc., Providence, R. I., and about 1 ml. pyridine in about 25 ml. dimethylformamide. The mixture was sealed to the atmosphere and heated on a steam bath for 15-20 hours. The Procion Brilliant Red H8BNS, is not completely soluble as it contains some inorganic salts. The polymer was then precipitated from about 400 ml. deionized water. After filtration, the polymer was washed on a Bunchner funnel with deionized water until little of the water soluble dye was evident in the wash. The polymer was dissolved in about 20 ml. tetrahydrofuran and precipitated by dropwise addition with rapid stirring to about 200 ml. deionized water. The precipitate was filtered until the filtrate was colorless. Then the polymer was washed on the funnel with about 20 ml. 10% HCl to convert sulfonic acid salt groups on the dye moiety to the acid form followed by washing with about 500 ml. water and about 500 ml. methanol. The sample was then dried in vacuo. By comparison, it is noted that unreacted starting material is not changed by this procedure and is and dyed.

Following the procedure of Example I, the correspondingly aminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carrier. It was also found that the triboelectric charging properties of these materials is dependent upon the mole percent functionally dyed, aminolyzed ester groups of the styrene-n-butyl methacrylate copolymer.

EXAMPLE X

Functionalized polymers were prepared for covalently dyed toner materials by ester group aminolysis of a styrene-n-butyl methacrylate copolymer (2.54:1.00 mole ratio). A mixture of about 117.5 grams (0.289 mole of ester functions based on elemental analysis) of the styrene-n-butyl methacrylate, about 41.0 grams of 1.6 hexanediamine, and about 39.3 grams (0.350 mole) of 1,4-diazabicyclo(2,2,2)octane was stirred under dry nitrogen at about 180° C (oil bath temperature 205° C) using an ambient aircooled condenser to allow escape of the n-butanol produced. Samples were removed periodically, quenched in 10% HCl by weight, and purified as in Example I.

The functionalized polymer was employed as an intermediate for covalently dyed toners. Dyeing of the functionalized polymer was accomplished by taking a mixture of about 20.0 grams of the polymer and about 2.0 grams of chlorosulfonyl copper phthalocyanine, a cyan, ($\lambda$ max 672 mu) reactive type, dye available from GAF Corp., Binghampton, N.Y., and about 200 ml. pyridine. The mixture was sealed to the atmosphere and heated under reflux for about 18 hours. The polymer was then precipitated from about 1000 ml. of about 2% aqueous sodium hydroxide. After filtration the polymer was washed on a Buchner funnel with saturated aqueous sodium bicarbonate until little of the water-soluble dye was evident in the wash. The dried polymer was dissolved in about 550 ml. xylene and extracted with aqueous sodium bicarbonate, then aqueous sodium hydroxide and several times with water. The xylene solution was added dropwise to 3 liters of methanol to precipitate the polymer. The polymer was collected, dried and dissolved in tetrahydrofuran and precipitated into methanol-water and finally water several times and dried.

Following the procedure of Example I, the correspondingly aminolyzed and covalently dyed polymers were cast as films from solution onto aluminum plates and thoroughly dried. It was found that the triboelectric charging properties of these polymers are nearly identical with those of Example I except that the magnitude of triboelectric charging changes. As in Example I, the values obtained are when using 250 micron nickel beads as a carrier. It was also found that the triboelectric charging properties of these materials is dependent upon the mole percent functionally dyed, aminolyzed ester groups of the styrene-n-butyl methacrylate copolymer.

Although specific components, proportions and procedures have been stated in the above description of the preferred embodiments of the novel toner compositions, other suitable components, proportions and procedures as listed above may be used with similar results. Further, other materials and procedures may be employed to synergize, enhance or otherwise modify the novel system.

Other modifications and ramifications of the present invention will appear to those skilled in the art upon the reading of this disclosure. These are intended to be included within the scope of this invention.

What is claimed is:

1. An electrostatographic toner composition for use in developing electrostatic latent images on a recording surface, said toner composition comprising finely-divided toner particles having an average particle diameter of less than about 30 microns, said toner particles comprising an aminolyzed polymer selected from the group consisting of styrenealkylmethacrylate and styrene-alkylacrylate, said polymer being covalently bonded with a reactive dye wherein said toner particles are characterized as possessing controlled triboelectric charging properties provided by the controlled aminolysis of said polymer, and wherein said dye is substantially metabolically inaccessible.

2. An electrostatographic toner composition in accordance with claim 1 wherein said aminolyzed polymer is obtained by systematic aminolysis of the pendant ester functions of said polymer to provide structural-triboelectric property relationships in said aminolyzed polymer.

3. An electrostatographic toner composition in accordance with claim 1 wherein said aminolyzed polymer is provided by varying the degree of aminolysis of said polymer stoichiometrically.

4. An electrostatographic toner composition in accordance with claim 1 wherein said aminolyzed polymer is provided by varying the degree of aminolysis of said polymer kinetically.

5. An electrostatographic toner composition in accidance with claim 1 wherein said controlled triboelectric properties of said toner particles are a function of the molecular structure of said aminolyzed polymer.

6. An electrostatographic toner composition in accordance with claim 1 wherein said aminolyzed polymer is the product of aminolysis with aminoalcohols of pendant ester functions of said polymer.

7. An electrostatographic toner composition in accordance with claim 1 wherein said aminolyzed polymer comprises a polymer having aromatic groups selected from electron releasing and electron withdrawing substituents.

8. An electrostatographic toner composition in accordance with claim 1 wherein said aminolyzed polymer has the general structure where X may be $NH_2$, OH, $NHCOC_6H_4R$, $OCOC_6H_4R$ and H, and wherein R may be an electron donating or an electron releasing substituent.

9. An electrostatographic toner composition in accordance with claim 1 wherein said aminolyzed polymer has reactive sites for covalent attachment of triboelectric charge modifiers.

10. An electrostatographic toner composition in accordance with claim 1 wherein said reactive dye contains chlorotriazinyl moieties.

11. An electrostatographic toner composition in accordance with claim 1 wherein said toner composition is obtained by direct polymerization to provide said reactive dye in the polymer backbone of said aminolyzed polymer.

12. An electrostatographic toner composition in accordance with claim 1 wherein said toner composition is obtained by direct polymerization with said dye pendent.

13. An electrostatographic toner composition in accordance with claim 1 wherein said toner composition is obtained by post polymerization attachment of said reactive dye.

14. An electrostatographic toner composition in accordance with claim 1 wherein said aminolyzed polymer contains 6-hydroxyhexylamide moieties.

15. An electrostatographic toner composition in accordance with claim 1 wherein said aminolyzed polymer contains 6-aminohexylamide side chains.

16. An electrostatographic toner composition in accordance with claim 1 wherein said polymer has been chemically modified by aminolysis of its ester groups with diamines to provide N-(aminoalkyl) carboxamide side chains in said aminolyzed polymer.

17. An electrostatographic developer mixture comprising finely-divided toner particles electrostatically clining to the surface of carrier particles, said carrier particles having an average particle diameter between about 50 microns and about 1,000 microns, and said toner particles having an average particle diameter of less than about 30 microns, said toner particles comprising an aminolyzed polymer selected from the group consisting of styrene-alkylmethacrylate and styrene-alkylacrylate, said polymer being covalently bonded with a reactive dye wherein said toner particles are characterized as possessing controlled triboelectric charging properties provided by the controlled aminolysis of said polymer, and said dye is substantially metabolically inaccessible in said toner particles.

18. A process for preparing an electrostatographic toner composition for use in developing electrostatic latent images on a recording surface, said process comprising covalently bonding an amonlyzed polymer selected from the group consisting of styrene-alkylmethacrylate and styrenealkylacrylate having pendant reactive sites with a reactive dye, and reducing the average particle diameter of the product to less than about 30 microns to provide toner particles characterized as possessing controlled triboelectric charging properties and wherein said reactive dye is substantially metabolically inaccessible.

* * * * *